United States Patent [19]
Athenes et al.

[11] Patent Number: 6,101,564
[45] Date of Patent: Aug. 8, 2000

[54] DEVICE FOR ORGANIZING THE ACCESS TO A MEMORY BUS

[75] Inventors: Claude Athenes, Paris; Bernard Louis-Gavet, Saint Egreve, both of France

[73] Assignee: SGS-Thomson Microelectronics S.A., Gentilly, France

[21] Appl. No.: 08/690,985

[22] Filed: Aug. 1, 1996

[30] Foreign Application Priority Data

Aug. 3, 1995 [FR] France .................................. 95 09640

[51] Int. Cl.[7] .................................................. G06F 13/00
[52] U.S. Cl. ........................................ 710/107; 710/113
[58] Field of Search ..................................... 395/287–305

[56] References Cited

U.S. PATENT DOCUMENTS

| | | | |
|---|---|---|---|
| 4,851,996 | 7/1989 | Boioli et al. ............................ | 364/200 |
| 5,274,822 | 12/1993 | Stanton et al. .......................... | 395/725 |
| 5,388,223 | 2/1995 | Guthrie et al. .......................... | 395/325 |
| 5,396,602 | 3/1995 | Amini et al. ............................ | 395/325 |
| 5,481,680 | 1/1996 | Larson et al. ........................... | 395/292 |

OTHER PUBLICATIONS

French Search Report from French Patent Application No. 95 09640, filed Aug. 3, 1995.

IBM Technical Disclosure Bulletin, vol. 27, No. 10b, Mar. 1985 Armonk, NY, US, pp. 5978–5981, "PROM Programmable Bus Arbitrator".

*Primary Examiner*—Ayaz R. Sheikh
*Assistant Examiner*—David A. Wiley
*Attorney, Agent, or Firm*—Wolf, Greenfield & Sacks, P.C.; James H. Morris; Theordore E. Galanthay

[57] ABSTRACT

This invention relates to a device for organizing access to a bus connecting a memory to at least two entities issuing asynchronous binary signals representing requests for access to the bus. The device supplies binary signals to authorize the access to an entity based on a priority determination between the different requests and includes a priority decoder in wired logic associated with an input register. A loading of the state of the access request signals happens, if an access request is present while a read or write cycle of the memory is executed, upon the arrival of a pulse on a signal issued by a memory controller associated with the memory and indicative of the end of a memory cycle.

17 Claims, 5 Drawing Sheets

DEVICE FOR ORGANIZING THE ACCESS TO A MEMORY BUS

BACKGROUND OF THE INVENTION

FIELD OF THE INVENTION

This invention relates to a device for organizing the accesses, or arbitrating the access requests, to a bus linked to a shared memory. The invention more specifically applies to implementing such a device for managing the access priorities to this bus between a microprocessor and different entities needing access to the memory.

SUMMARY OF THE INVENTION

The present invention aims at organizing the accesses to the bus without it being necessary to use the microprocessor and by using all the potential read or write cycles in case of a surge of requests.

The present invention also aims at avoiding the monopolizing of the bus by an entity while other entities request access to the bus.

The present invention also aims at enabling the sharing of the bus between several devices of the same type associated with a same microprocessor and a same memory.

To achieve these objects, the present invention provides a device for organizing the access to a bus connecting a memory to at least two entities issuing asynchronous binary signals representing requests for access to the bus, the device issuing binary signals for authorizing the access to the bus by these entities based on a determination of the priority between the different requests and including a priority decoder in wired logic associated with an input register, a loading of the state of the access request signals into the input register occurring, when an access request is present while a read or write cycle of the memory is executed, upon the arrival of a pulse on a signal indicative of the end of a memory cycle and issued by a memory controller constituting an electric interface between the bus and the memory.

In the context of the present invention, a memory controller is a device constituting an electric interface between the bus and the physical memory. This interface does not carry out any address calculation. It only transfers the addresses, the data and the control signals to the memory by achieving, if necessary, a multiplexing of the addresses. The memory controller does not identify the entity from which it receives the data and the addresses.

According to an embodiment of the present invention, the signal indicative of the end of a memory cycle is sent by the memory controller in advance with respect to the actual end of the memory cycle, by a delay which is a function of the access request processing time of the priority decoder.

According to an embodiment of the present invention, the device includes a programmable register containing codes for identifying the entities, a location of each code in the programmable register determining the priority rank assigned to the entity associated with the code and the programmable register being read by the priority decoder as the loading of the state of the access request signals in the input register is triggered.

According to an embodiment of the present invention, the loading of the state of the access request signals in the input register is controlled by a signal representing a logic combination taking into account the signal indicative of the end of the memory cycle and a first clock signal.

According to an embodiment of the present invention, the priority decoder sends to the memory controller a binary signal indicative of the presence of an authorized access request, the state of said binary signal being switched to an active state by the presence of an authorized access request and, to an idle state, by the arrival of a pulse on the signal indicative of the end of the memory cycle.

According to an embodiment of the present invention, the signal for controlling the input register takes into account the state of the signal indicative of the presence of an authorized access request.

According to an embodiment of the present invention, one of the entities sends periodic access requests and has a specific priority management scheme which includes assigning a lowest priority rank thereto for one half-period of a time interval which separates two of its access requests and a highest priority rank for a second half-period of the interval when its access request has not been answered in the first half-period.

According to an embodiment of the present invention, the memory is a dynamic memory, the entity with the specific priority management scheme including a circuit for refreshing the dynamic memory.

According to an embodiment of the present invention, one of the entities includes a microprocessor.

According to an embodiment of the present invention, the device includes means for connecting other devices of a same type to organize a sharing of the memory between several groups of entities, the assignment of the bus to one of the groups of entities being performed by circulating a pulse, or "token", in a single wire line connecting the different devices in a ring, each device receiving the "token" as an input signal sent by a preceding device as an output signal.

According to an embodiment of the present invention, said connecting means include a device for regenerating the "token" by using flip-flops controlled by a second clock signal and logic gates, the regenerating device receiving, besides the input signal, a binary signal indicative of the existence of an access request within the group associated therewith and issuing, to the priority decoder of the device associated therewith, a binary signal indicative of an assignment of the "token" to the device, the width of the pulse which constitutes the "token" corresponding to one period of the second clock signal.

According to an embodiment of the present invention, the sending of the "token" by the regenerating device as the output signal is triggered either by the arrival of the signal indicative of the end of a memory cycle or by the absence of access requests from the entities of the group associated therewith while the "token" is present on the input signal, the sending of the "token" being synchronous with the second clock signal.

According to an embodiment of the present invention, the control signal of the input register of a device is enabled by the signal indicative of an assignment of the "token" to the device.

According to an embodiment of the present invention, said means include a device for initially generating the "token" under control of a bit, the generating device issuing a signal for switching the regeneration device between a ring operation and a local mode operation where it permanently holds the right to authorize an access to the bus.

These objects, features and advantages, as well as others, of the present invention will be discussed in detail in the following description of specific embodiments, taken in conjunction with the following drawings, but not limited by them.

DETAILED DESCRIPTION

For clarity, the same elements have, whenever possible, been designated by the same reference numbers in the different figures. Additionally, only the elements and the connections therebetween which are necessary to the understanding of the invention have been shown.

According to the present invention, the use of a bus connecting a microprocessor to a memory is organized independently from the microprocessor. In other words, the present invention provides for the management of access requests sent by entities which need to exchange data with the memory, without using the microprocessor. The microprocessor is, from this point of view and according to the invention, considered as an entity. The workload of the microprocessor is thus reduced, which makes it more available to perform other processing.

Figure 1:
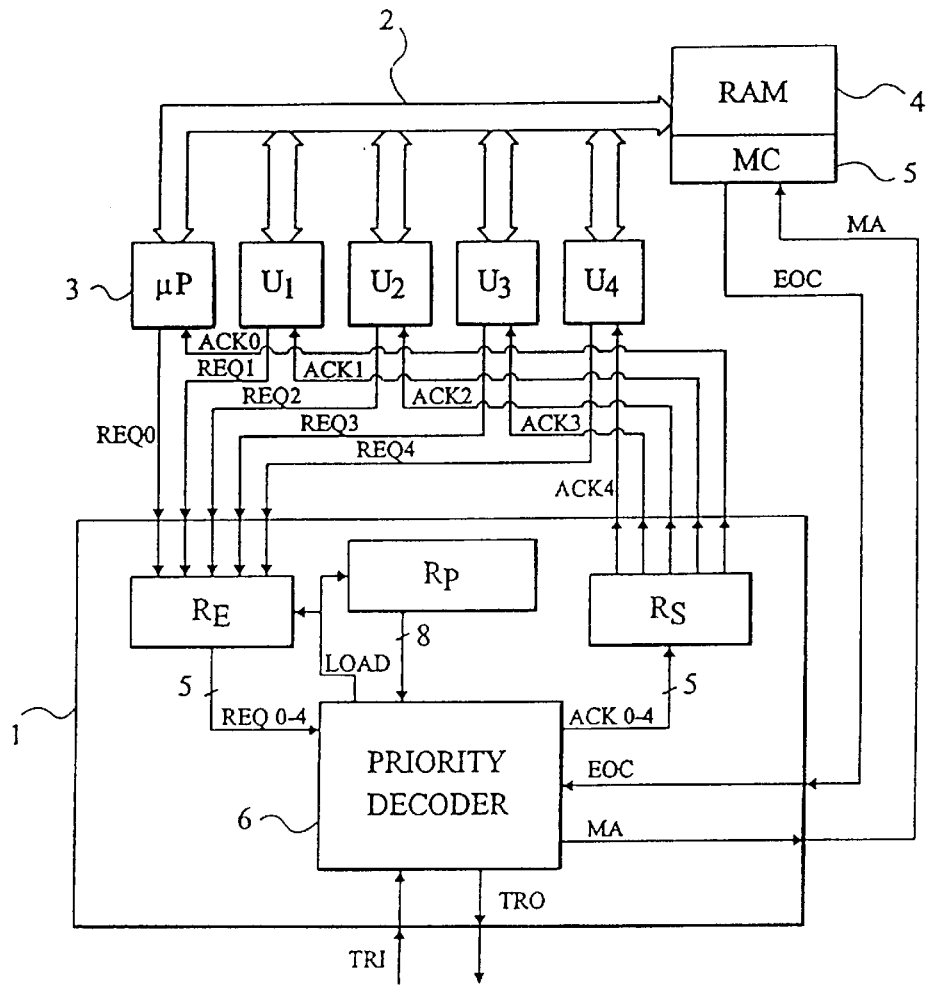
FIG. 1 shows, in the form of block diagrams, an embodiment of a device for organizing the access to a bus according to the present invention.

FIG. 1 is a block diagram of an embodiment of a device 1 for organizing the accesses to a bus 2 according to the present invention.

Bus 2 connects a microprocessor µP 3 with a RAM 4. Several entities, here four entities U1, U2, U3 and U4, needing to exchange data with memory 4 are also connected to bus 2. Although bus 2 has been shown as a single bus, in practice it consists of several buses for carrying not only the data but also the addresses of the data into memory 4 as well as a signal R/W for indicating whether the entity having access to the address and data buses intends to read from or write into the memory 4.

Each entity, as well as the microprocessor 3, is likely to issue asynchronous access requests which are sent onto inputs of an input register RE of device 1. These access requests are sent by microprocessor 3 and the entities, respectively U1, U2, U3 and U4, in the form of binary signals, respectively REQ0, REQ1, REQ2, REQ3 and REQ4, the state of which indicates a requirement, or an absence of a requirement, to have access to bus 2. For example, the idle state of signals REQ0 to REQ4 is a "0" state and these signals are set to a "1" state when the entity associated therewith requests access to memory 4.

A priority decoder 6 periodically loads signals REQ0 to REQ4 into register RE and interprets them immediately upon loading. The loading period of register RE corresponds, in case of a surge of requests and as will be seen hereafter, to a duration of a read or write cycle in memory 4. The function of register RE is to avoid conflicts within priority decoder 6 since the states of signals REQ0 to REQ4 change asynchronously.

The interpreting of signals REQ0 to REQ4 by decoder 6 has the purpose of determining which entity, among those which have requested access to bus 2, has the highest priority rank and is, therefore, to be granted the access. Priority decoder 6 decides to grant microprocessor 3 or a given entity access to bus 2 according to the priority rank associated with the entity (or with microprocessor 3) contained in a register RP programmable by the microprocessor. This register RP is, for example, an eight-bit register which contains a coding of the priority ranks associated with the three entities U1, U2, U3 and with microprocessor 3. According to the present invention, entity U4 is assigned a specific priority management scheme which will be understood in relation to the description of the contents of programmable register RP by referring to FIG. 2.

The decision of priority decoder 6 is transmitted to microprocessor 3 and to the different entities U1, U2, U3 and U4 in the form of binary signals, respectively ACK0, ACK1, ACK2, ACK3 and ACK4, the state of which indicates for each entity whether the access authorization to bus 2 has been granted or not. For example, a "0" state present on one of signals ACK0 to ACK4 indicates that bus 2 is not available (or not requested) for the corresponding entity, while a "1" state indicates that the corresponding entity has been granted access.

Signals ACK0 to ACK4 transit through an output register RS so that the accesses to bus 2 are synchronous with a control clock. This clock corresponds, for example, to the clock of microprocessor 3 and is, for example, a 32-MHz clock. It should be noted, however, that signals REQ1 to REQ4 are not necessarily synchronous with this clock. The control signals connected to the clock have not been shown in FIG. 1, for clarity.

In the example shown, registers RE and RS are five-bit registers. The device according to the present invention can, of course, be sized to organize the accesses to bus 2 of a greater number of entities. For this purpose, the number of bits of registers RE, RS and RP would be increased.

The states of signals REQ0 to REQ4 change asynchronously and several access requests from different entities can, or not, be simultaneous. Conversely, on the output side of device 1, a single one of the authorization signals ACK0 to ACK4 is set to "1" corresponding to an access authorization, all the other authorization signals being at "0".

Two signals, respectively EOC and MA provide, according to the present invention, synchronization between device 1 and memory 4 according to its availability.

Signal EOC is a signal which indicates, by a pulse issued by a memory controller MC 5 associated with memory 4, the end of a read or write cycle. This EOC signal is sent, by controller 5, to priority decoder 6.

The role of controller 5 is to adapt the addresses, data and control of bus 2 to the type of memory 4 to which bus 2 is connected.

Signal MA is issued, by decoder 6, to controller 5 of memory 4 to indicate thereto the presence of an access request to be granted. Signal MA is a binary signal, the state of which indicates to memory controller 5 that memory 4 will, or will not, be addressed. For example, a "1" state indicates that an access authorization has been granted by device 1. The setting of signal MA to state "1" is simultaneous with the setting to state "1" of one of signals ACK0 to ACK4. Signal MA is, for example, obtained by the addition (logic OR) of signals ACK0 to ACK4, or of signals REQ0 to REQ4 at the output of register RE. Signal MA is positioned to state "0" at the arrival of a pulse on signal EOC to indicate that memory 4 is free for a new access.

Register RS also includes an additional bit for signal MA to be synchronous with signals ACK0 to ACK4.

If signal MA is at state "0" and an entity U1, U2, U3 or U4 or microprocessor 3 sends an access request, the request is, according to the present invention, satisfied almost immediately. For this purpose, the loading of the state of signals REQ0 to REQ4 into register RE, and thus the potential authorization of a new access by priority decoder 6, is controlled by a signal LOAD from priority decoder 6.

This signal LOAD is configured to enable a fastest possible periodic loading when memory 4 is free when an access request arrives onto one of the inputs of register RE. Conversely, if an access request arrives during a read or write cycle of memory 4, the loading of the state of signals REQ0 to REQ4 into register RE is authorized by signal LOAD at the arrival of a pulse on signal EOC. Signal LOAD is, for example, the result of a logic "OR" between the product of signal EOC by signal MA and the product of a first clock signal CLK1 by the complement of signal MA.

The arrival of a pulse on signal EOC further serves to allow decoder 6 to switch to state "0" those signals ACK0 to ACK4 which are at state "1". This enables both the granting of authorization of access to bus 2 to another entity and informing the entity which has just had access to bus 2 that memory 4 has ended its task. When a signal ACK switches to state "1", the entity associated therewith presents an address on the address bus and the read/write bit on the corresponding single wire bus. If the entity has addressed the memory in write mode, it also presents the data on the data bus. If the entity has addressed the memory in read mode, it samples the data bus when signal ACK switches to state "0".

Signal LOAD also controls the reading of programmable register RP by decoder 6.

Decoder 6 issues to memory controller 5 the binary signal MA which indicates thereto, by its state, whether memory 4 will be addressed or not. State "0" indicates that no request is present at the inputs of register RE while state "1" indicates that an access authorization has been granted.

RAM 4 can be a static memory (SRAM) or a dynamic memory (DRAM).

In case of a DRAM, a circuit for refreshing this memory must periodically have access to bus 2 to read the cells of memory 4 and thus refresh them. According to the present invention, the refreshing circuit then constitutes entity U4 and its access requests to bus 2 are managed in a specific way by device 1, as will be discussed hereafter in relation to the description of FIG. 2.

If memory 4 is an SRAM, device 1 organizes the access to bus 2 between microprocessor 3 and entities U1, U2 and U3.

Priority decoder 6 further receives a signal TRI and issues a signal TRO. These two signals are related to, according to the present invention, sharing a same bus 2 between several groups of entities, each associated with an arbitration device 1 as will be discussed below in relation to FIG. 4.

An advantage of the present invention is that the assignment of bus 2 to an entity U1, U2, U3, U4 or to microprocessor 3 occurs without the intervention of microprocessor 3.

Another advantage of the present invention is that the priority ranks assigned to microprocessor 3 and to entities U1, U2 and U3 can be dynamically modified by changing of the codes contained within programmable register RP. The programming of this register is performed by the microprocessor 3.

Figure 2:
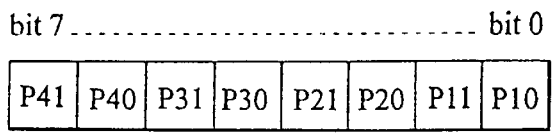
FIG. 2 shows the contents of a programmable register according to the present invention included in such a device as shown in FIG. 1.

FIG. 2 illustrates the contents of the programmable register RP of the device shown in FIG. 1.

In the example shown, this register is an eight-bit register which contains a coding of the priority assigned to the three entities U1, U2, U3 and to microprocessor 3. As has already been stated, the circuit for refreshing a DRAM, the priority of which is managed differently than that of the other entities by decoder 6, constitutes entity U4.

Each of the remaining three entities and microprocessor 3 is identified by a two-bit code. The eight bits of register RP are divided into four pairs of bits, respectively {P10, P11}, {P20, P21}, {P30, P31} and {P40, P41}. The priority rank of an entity is determined by the pair of bits receiving the code which identifies the entity. The bits contained in the pair {P10, P11} correspond to the identifier bits of the entity having the highest priority rank among the entities (U1, U2, U3 and 3) which are encoded. The code identifying the entity with the lowest priority rank is contained in the pair {P40, P41}.

A feature of the present invention is that priority decoder 6 actually works on six priority ranks, and not on four. Two additional priority ranks are assigned to refresh circuit U4 if memory 4 is a DRAM. If the priority ranks programmably assigned to entities U1, U2, U3 and to microprocessor 3 are named P1, P2, P3 and P4, the two additional ranks assigned to refresh device U4 are P0 and P5. Rank P0 is the absolute priority rank while rank P5 is the lowest priority rank.

Thus, according to the present invention, two priority ranks are assigned to refresh device U4. The invention exploits the fact that the refreshing of a dynamic memory is not performed randomly, but periodically, and the fact that this refreshing is not performed once for the whole memory but for portions thereof.

Conventionally, the period between two assignments of bus 2 to the refreshing operation is fixed and the refresh circuit is assigned the highest priority rank. Indeed, the memory cannot be allowed, if the contents of the memory are to be kept, to go unrefreshed for too long under the pretext that other entities, which would have a higher priority with respect to the refreshing operation, are requesting access to bus 2 at the same time as the refresh circuit. Conventionally, the refresh circuit is assigned bus 2 as soon as it requests it, for example every 15 microseconds, for at least the duration of a read cycle. In fact, the complete refreshing of memory 4 takes much longer (about 1 to 8 milliseconds according to the capacity of memory 4) but does not happen in a single run.

According to the present invention, refresh circuit U4 is assigned either the lowest priority rank P5 or the highest priority rank P0, and this assignment is according to whether its access request was satisfied during a period when it had the lowest priority rank P5.

In other words, for a first half-period (for example 7.5 milliseconds) of the regular refresh interval (for example, 15 milliseconds) between two requests for refreshing, the priority rank of circuit U4 is P5, that is, it will have access to internal bus 2 only if the bus is free. If its request is satisfied during this half-period, its priority rank is not modified until the first half-period of the following refresh interval. If, conversely, its request has not been satisfied during the first half-period, it is then assigned the absolute priority rank P0 for the second half-period of the regular refresh interval between two of its access requests.

Thus, refresh circuit U4 has access to bus 2 in a regular, but not periodic, fashion. It has access to bus 2 once every 15-microsecond interval, but any time between the beginning of the interval and the first arrival of a pulse on signal EOC in the second half-period of the interval.

An advantage of the present invention is that, as there is a very strong chance that the request at rank P5 of circuit U4 will not be answered during the first half-period, the other entities are not penalized in case of a temporary surge of simultaneous requests. The security of the refresh device is however ensured by giving it the highest priority if the surge of requests continues after this first half-period.

The choice of the half-period as the priority rank changing limit of refresh circuit U4 makes the processing of the priority particularly simple. Indeed, using the periodic access request signal REQ4 issued by refresh circuit U4 and dividing its period by two is enough to obtain a binary signal reflecting its priority.

The specific priority mode assigned to the circuit for refreshing a dynamic memory can, should the case arise, be used for another entity if memory 4 is a static memory. Indeed, it can occur that another entity has a similar operating mode, that is, a need for regular, but not necessarily periodic, access to bus 2.

Preferably, the logic of priority decoder 6 is implemented so that, in case of simultaneous requests, a same entity cannot be assigned bus 2 for two successive read or write cycles. In other words, an entity which has just had access to bus 2 must wait, at least for one memory cycle, when another request from another entity is raised, and this even if it has the highest relative priority rank (that is, among the entities requesting access). It is thus avoided that a same entity with the highest relative priority monopolizes bus 2.

An advantage of the present invention is that in case of a surge of access requests, there is no waiting between the end of a read or write cycle of memory 4 and the beginning of the following cycle. The read or write cycles of memory 4 thus can, according to the present invention, be contiguous. Therefore, the organizing of the accesses to bus 2 causes no loss of time. If one or several entities request access to the bus, they will be granted this access with no loss of time between two contiguous memory cycles.

Figure 3:
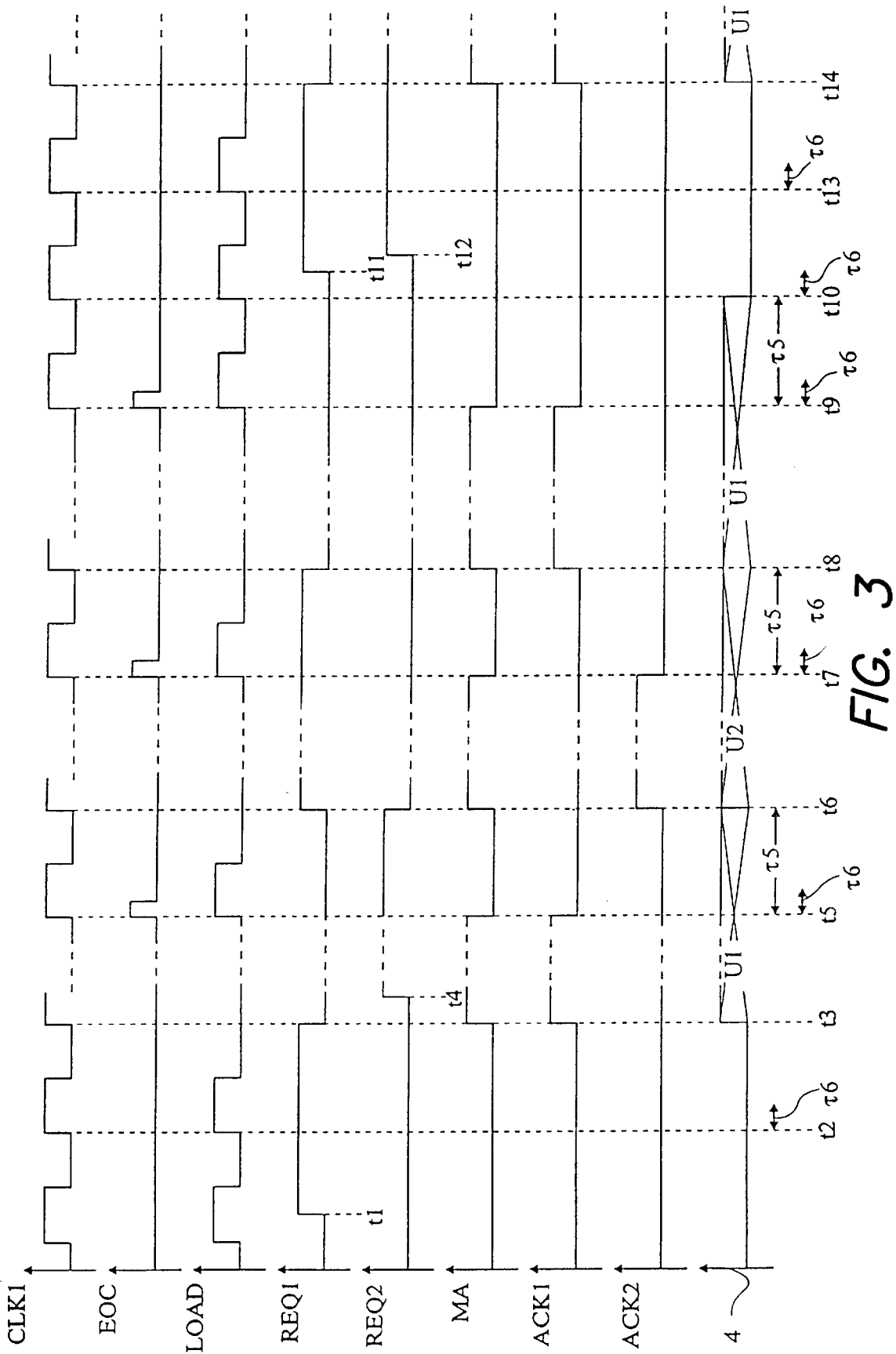
FIG. 3 illustrates, in the form of timing diagrams, the operation of a device for organizing the access to a bus as shown in FIG. 1.

This feature of the present invention will be better understood in relation to the following description of FIG. 3.

FIG. 3 shows, in the form of timing diagrams, an example of a situation of arbitration of the access to memory 4 by device 1. For clarity, it has been assumed, for establishing the diagrams that only the two entities U1 and U2 were likely to require access to bus 2.

FIG. 3 shows the timing diagrams of signals CLK1, EOC, LOAD, REQ1, REQ2, MA, ACK1 and ACK2 and of the cycles of memory 4. For clarity, these timing diagrams are not to scale. It is assumed that entity U1 has a higher priority than entity U2.

As has been stated above, signal LOAD for loading possible access requests into register RE is a logic combination of signals CLK1, EOC and MA.

It is assumed that no request is present before a time $t_1$ when entity U1 sets signal REQ1 at state "1". Before time $t_1$, signal LOAD thus causes the periodic loading of the states of signals REQ1 and REQ2 by following the cycles of clock signal CLK1 (signal MA is at state "0").

At time $t_1$, entity U1 requests access to the bus. The loading of this request happens at the following rising edge (time $t_2$) of signal CLK1.

It is assumed that priority decoder 6 requires a delay $\tau_6$ to examine the access requests and issue an access authorization. This delay depends on the logic of priority decoder 6. It is assumed that the delay is shorter than the period of signal CLK1. This condition is easily implementable in practice. For example, the frequency of clock signal CLK1 is around 32 MHz, the delay $\tau_6$ required for decoding the priority is around 10 nanoseconds.

Thus, at a time $t_3$ which corresponds to the following rising edge of signal CLK1, decoder 6 sets signals ACK1 and MA at state "1". The switching of signal ACK1 to state "1" causes signal REQ1 to switch to state "0", entity U1 considering itself as served. The switching of signal MA to state "1" informs memory controller 5 of the beginning of a first read or write cycle in memory 4. In practice, the beginning of the memory cycle is slightly delayed with respect to the switching of signal MA to state "1".

At a time $t_5$, memory controller 5 issues a pulse on signal EOC. This pulse is, according to the present invention, issued before the actual end of the memory cycle which happens at a time $t_6$, after a delay $\tau_5$ with respect to the pulse on signal EOC. As memory controller 5 knows the duration of a memory cycle, it can be configured to issue the pulse of signal EOC in advance with respect to the actual end of a memory cycle and always with the same delay $\tau_5$. This enables priority decoder 6 to anticipate the actual end of a memory cycle. Delay $\tau_5$ is a function of the processing time of the access requests by device 1 (time $\tau_6$ and the time required for the synchronizing by register RS).

At time $t_5$ and under the effect of the pulse of signal EOC, signals MA and ACK1 switch back to state "0". Signal LOAD switches to state "1" during the pulse of signal EOC, which enables the loading of the states of signals REQ1 and REQ2 at time $t_5$. For clarity, the delay of the switching to state "0" of signals MA and ACK1 with respect to the arrival of the pulse on signal EOC has not been taken into account. In practice, the pulse on signal EOC arrives during the penultimate period of signal CLK1 contained in the memory cycle so that signal MA switches to state "0" at the rising edge (here, time $t_5$) of signal CLK1, which precedes the end of the memory cycle.

Thus, decoder 6 examines signals REQ1 and REQ2 during the last clock cycle of the current memory cycle. It is assumed that entity U2 has issued an access request at a time $t_4$ during the first memory cycle. This request is loaded in register RE at time $t_5$. Even if it is assumed that entity U1 intends to perform two successive read or write cycles in memory 4, its signal REQ1 remains however at state "0" until time $t_6$, which corresponds to the actual end of the current memory cycle. Indeed, entity U1 does not set its signal REQ1 before the end of the memory cycle, since it still has access to bus 2.

Now, at this time $t_6$, decoder 6 sets signals MA and REQ2 at state "1" to grant entity U2 access to bus 2. Thus, even if entity U1 holds the priority over entity U2, its new successive access request will only be satisfied at the end of the second memory cycle which is used by entity U2. It is thus avoided that entity U1 monopolizes bus 2.

Another advantage of such an anticipated priority decoding with respect to the actual end of a memory cycle is that it makes the memory cycles contiguous in case of a surge of access requests. That is, time $t_6$ both corresponds to the end of the first memory cycle and to the beginning of the second memory cycle.

At a time $t_7$ where a pulse indicative of the upcoming actual end of the second memory cycle appears on signal EOC, the state "1" of signal REQ1 and the state "0" of signal REQ2 are loaded in register RE. Thus, a new access to bus 2 is granted to entity U1, at a time $t_8$.

It is assumed that at the end (time $t_{10}$) of the third memory cycle, more precisely between a time $t_9$ where a pulse appears on signal EOC and on actual end (time $t_{10}$) of the third memory cycle, no access request is present and entity U1 does not immediately want a new access. An operation with periodic examination of the access requests under control of signal CLK1 is thus resumed.

Entities U1 and U2 are assumed to both request an access to bus 2, respectively at times $t_{11}$ and $t_{12}$, included in a same period of signal CLK1. Whether times $t_{11}$ and $t_{12}$ are simultaneous or not is of no importance.

At the arrival of the following rising edge (time $t_{13}$) of signal CLK1, the LOAD signal switches to state "1" and decoder 6 examines the access requests which are loaded into register RE. As two access requests are present, the decoder assigns bus 2 to the entity of highest priority, here entity U1, at a time $t_{14}$ which corresponds to the following rising edge of signal CLK1.

Since entity U2 has not been served, signal REQ2 remains at state "1" until the end of the fourth memory cycle assigned to entity U1.

Bus 2 will be assigned to entity U2 at the end of this fourth memory cycle. As for the assignment of a further memory cycle, whether entity U1 requests a new access does not matter, since this new possible request arrives only after the assignment of bus 2 to entity U2.

An advantage of the present invention is the fact that the device adapts to any RAM 4, static or dynamic, and this whatever the memory's size and cycle length. Indeed, device 1 does not have to be dedicated to a specific memory, due to memory controller 5, to the use of signals EOC and MA and to the possible control of the refreshing of a DRAM.

Figure 4:
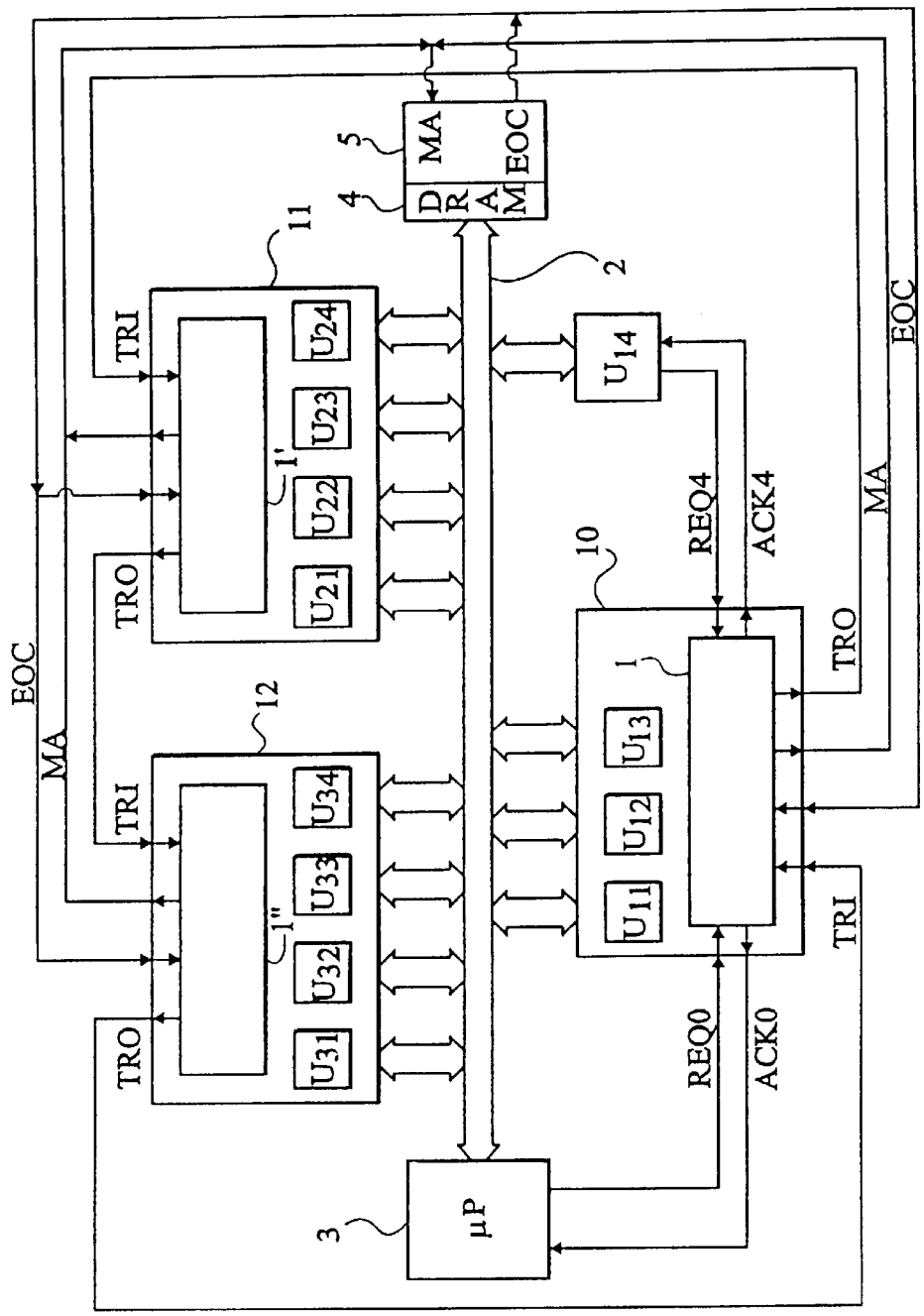
FIG. 4 shows, in the form of a block diagram, an embodiment of a token ring according to the present invention associating several devices of the type shown in FIG. 1.

FIG. 4 illustrates an embodiment of a "token" ring according to the present invention enabling the sharing of a same memory 4 between several groups, respectively 10, 11 and 12, of entities, each of which is associated with an arbitration device 1 as shown in FIG. 1. The association of several arbitration devices 1 enables, according to the present invention, the sharing of the same bus 2, and thus the same memory 4, between several groups of entities within each group of which an access priority order is established.

According to the present invention, the sharing mode is organized in a ring, that is, the different groups of entities are successively given an assignment to bus 2.

A first arbitration device 1 is associated with a first group 10 of three entities U11, U12, U13, with microprocessor 3 and, if memory 4 is a dynamic memory, with the refreshing device U14 of this memory.

A second arbitration device 1' is associated with a second group 11 of four entities U21, U22, U23 and U24. Indeed, microprocessor 3 being common to all groups, its accesses to bus 2 are only managed by the first device 1, selected arbitrarily.

As for refresh device U14, its accesses also are preferably managed by the first device 1 only. Indeed, and as will be seen later, the minimum periodicity of the accesses to the bus of device 1 is higher than the periodicity of the requests of refresh device U14.

A third arbitration device 1" is also associated with a third group 12 of four entities U31, U32, U33 and U34.

For clarity, the example shown includes three groups 10, 11 and 12 only. In practice, a maximum number of groups depends on the mean frequency of the access requirements of the different entities.

Each group 10, 11, 12 is organized in a way similar to that discussed in relation to FIG. 1.

According to the present invention, the sharing of bus 2 is managed by the arbitration devices themselves. For this purpose, devices 1, 1' and 1" are connected in a ring by means of signals TRI and TRO on a single wire link. The output signal TRO of device 1 is sent onto the TRI signal input of device 1', the output signal TRO of device 1' is sent onto the TRI signal input of device 1" and the output signal TRO thereof is sent onto the TRI signal input of device 1. The function of these signals TRI and TRO is to circulate a "token", in the form of a pulse, in the ring. Each device 1, 1' or 1" can have access to bus 2 when holding the "token".

According to the present invention, each time a pulse carried by signal EOC arrives on the priority decoder 6 of a device, the device which holds the "token" issues a pulse on its output TRO. Thus, the following device receives the "token" and can assign bus 2 to one of its entities, and so on. When a group of entities holds the "token" and an entity of the group wants to have access to memory 4, the device 1, 1' or 1" of this group positions signal MA at state "1". If an arbitration device which receives the "token" has, at the inputs of its register RE (FIG. 1), no access request from one of its entities, it immediately sends the pulse to the following device through its signal TRO.

The compulsory circulating of the "token" at the arrival of a pulse on signal EOC forbids the monopolizing of bus 2 by a group if another group of entities requires the bus. Signal EOC issued by memory controller 5 thus is, according to the present invention, sent to each of devices 1, 1' and 1". Similarly, the signals MA of each of devices 1, 1' and 1" are all sent to memory controller 5.

An advantage of such an association is that it enables the sharing of a same memory 4 between a number of entities without using the microprocessor 3 and while respecting an access balance for several groups which might simultaneously require bus 2.

Another advantage of the present invention is that the circulating of the "token" forbids an entity of a group to have access to bus 2 during two successive memory cycles if another entity of the same group or of another group has also requested access. Conversely, if only one entity among all the entities of all the groups of entities requests access to the bus, it will be the only entity to have access to bus 2.

The number of groups of entities which can be connected by the wire link depends on the length of the refresh cycle. If, for example, the duration of a memory cycle is about 250 nanoseconds and the period of the refresh cycle is 15 microseconds, neglecting the time required for circulating the "token", up to 60 groups of entities can be connected to bus 2 without affecting the refreshing of memory 4. Indeed, by the compulsory circulating of the "token" at the end of each memory cycle, the refreshing device U14 associated with the device 1 is ensured to have access to bus 2 at least once every refresh cycle.

In the implementation example shown in FIG. 4, all arbitration devices 1, 1' and 1" are assumed to include registers RE, RS and RP (not shown in FIG. 4) of identical size. Of course, it can be devised that the different groups 10, 11 and 12 include numbers of entities different from one group to another by appropriately sizing the registers RE, RS and RP of devices 1, 1' and 1". Similarly, groups 11 and 12 can each, when necessary, control the accesses of a fifth entity (not shown) requiring regular, but not periodic, accesses to bus 2 and with which the signals REQ4 and ACK4 of devices 1', 1", respectively, are associated. The same happens with device 1 when memory 4 is an SRAM.

To enable the circulation of the "token", each device 1, 1' or 1" includes, within its priority decoder 6, a circuit for generating and regenerating the pulse (not shown in FIG. 4).

Figure 5:
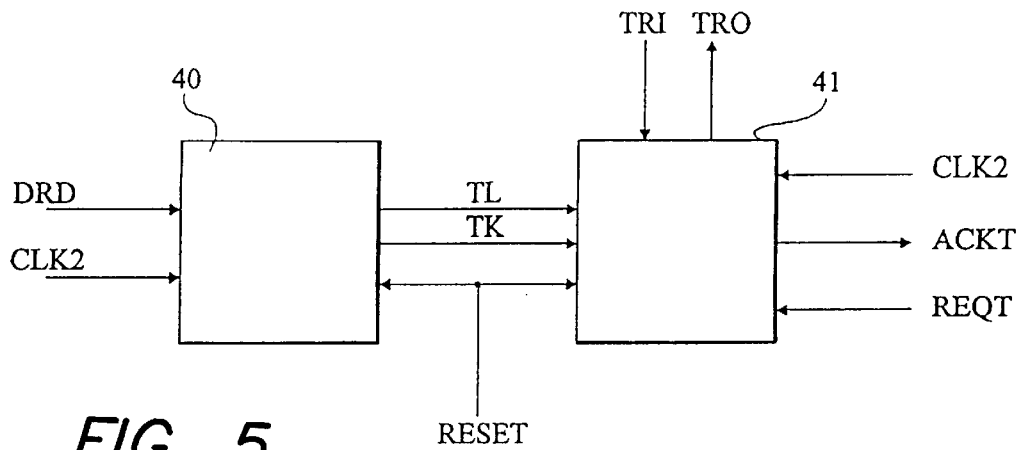
FIG. 5 shows, in the form of block diagrams, a circuit for generating and regenerating a "token" according to the present invention which is included in each of the devices shown in FIG. 4.

FIG. 5 shows an embodiment of a device for generating and regenerating the pulse constituting the "token" according to the present invention.

Such a device includes a pulse generator 40 for initially generating the pulse constituting the "token" and a pulse generator 41 for regenerating the pulse as it circulates in the ring.

Pulse generator 40 generates a pulse at power-on of the circuit or after a reset triggered by a pulse on a signal RESET. Signal RESET is used, as will be seen hereafter, either to generate a new "token" or to enable the local operation of one of groups 10, 11 or 12. Pulse generator 40 receives, from microprocessor 3, a bit DRD which is at state "1" during the periods when the ring is to operate and which is at state "0" outside these periods, for example, for local operation of one of the groups.

Pulse generator 40 provides to pulse generator 41 a signal TL carrying the "token" which it initially issues, as well as a binary signal TK, to enable the "token".

Pulse generator 41 receives the "token" carried by signal TRI and to either almost immediately reissue the "token" through signal TRO if none of the associated entities has requested access, or reissue the "token" at the end of a memory cycle assigned to one of the associated entities.

Pulse generator 41 receives, besides the signal RESET issued by microprocessor 3 and signals TRI, TK and TL, a binary signal REQT indicative, by a state "1", of the presence of an access request within the associated device 1, 1' or 1". This signal REQT is set by the priority decoder 6 of the device. Signal REQT corresponds, for example, to an OR combination of signals REQ0 to REQ4, at the input of register RE (FIG. 1) with signal MA, the result of this combination being enabled, for example, by an AND combination with the complement of signal TRO and the complement of signal EOC.

Pulse generator 41 further issues, besides signal TRO, a binary signal ACKT which signals, by a state "1", the presence of the "token" to the priority decoder 6 of the associated device 1, 1' or 1", when signal REQT is at state "1".

According to the present invention, signal REQT also meets the following conditions. The signal REQT of an arbitration device which has access to the memory remains at state "1" for the whole duration of a memory cycle (in fact, while signal MA is at state "1") to hold the "token" until the end of the memory cycle that it is using. Further, the switching to state "0" of signal REQT is forced at the end of the memory cycle (in fact, slightly before the actual end of the cycle, for example at the arrival of a pulse on signal EOC) to force the sending of the "token", even if one of signals REQ of the group having access to the bus is at state "1" at the input of register RE, so as to avoid the monopolizing of bus 2 by this group of entities. Moreover, the switching to state "1" of signal REQT during the clock cycle is forbidden when the "token" is sent (signal TRO), to avoid token generator 41 of the arbitration device which has just sent the "token" switching signal ACKT back to state "1".

Figure 6:
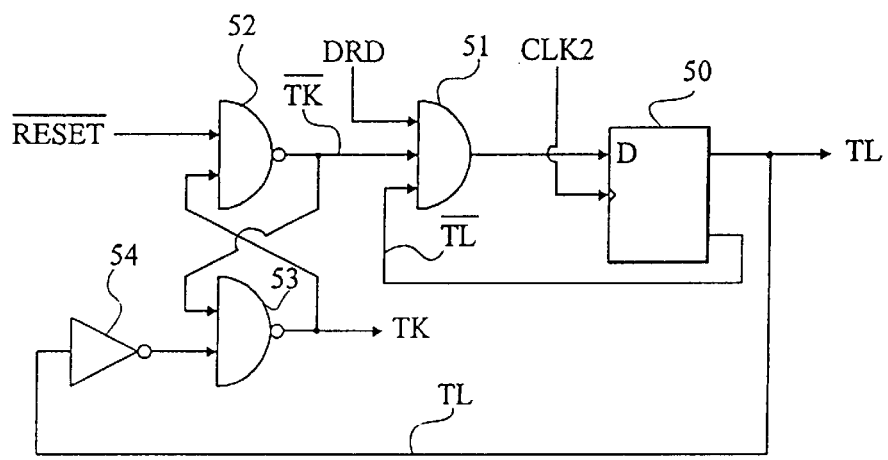
FIG. 6 shows an example of implementation of a device for generating the "token" of a circuit as shown in FIG. 5.
Figure 7:
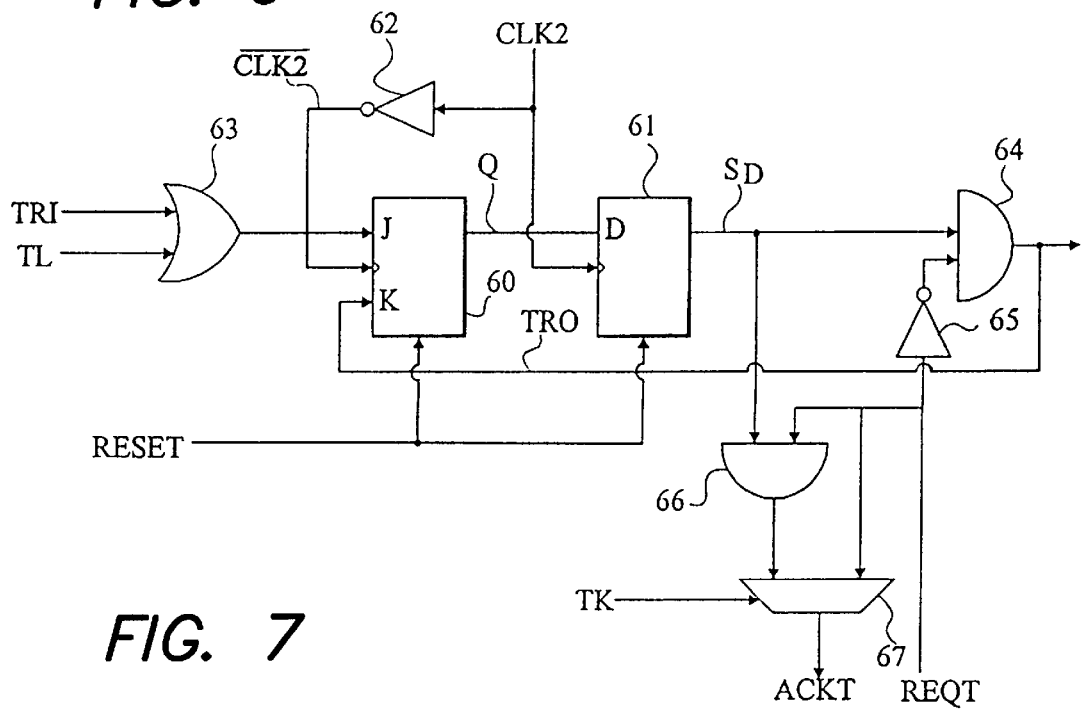
FIG. 7 shows an example of implementation of a device for regenerating the "token" of a circuit as shown in FIG. 5.

The practical implementation of the logic for obtaining signal REQT lies within the abilities of those skilled in the art according to the functional information given in relation with FIGS. 5 to 7.

Token generator 40 and token regenerator 41 each receive a clock signal CLK2. It will be ensured that signal CLK2 is the same for all arbitration devices 1, 1' and 1" of the ring. Preferably, signal CLK2 corresponds to the signal CLK1 used for obtaining the signal LOAD (FIG. 3).

The token generator 40 for initial generation of the token could, if necessary, be implemented within one of the devices only, since the "token" is sent, initially, by a single one of devices 1, 1' and 1". However, to standardize the arbitration device according to the present invention and to enable a local operation of any group of entities 10, 11 or 12, it will be preferred to systematically provide a block 40. It will however be ensured that bit DRD issued by microprocessor 3 is sent only to the token generator 40 of the device arbitrarily selected for the initial sending of the "token".

FIG. 6 shows an example of implementation of the token generator 40 for initially generating the "token".

The "token" is initially generated in the form of a pulse carried by the signal TL issued by a non-inverting output of a D flip-flop 50. Flip-flop 50 is driven by the rising edges of clock signal CLK2. The D input of this flip-flop 50 is connected to the output of a three-input AND gate 51. This gate 51 receives bit DRD, the complement of the signal TL issued by the inverting output of D flip-flop 50 and the complement of signal TK. Signal TK is generated by the association of two two-input NAND gates 52 and 53, connected as a bistable latch. A first gate 52 receives the complement of signal RESET and the output signal TK of a second gate 53. This second gate 53 receives the complement of the signal TK issued by the output of gate 52 and the complement of the signal TL issued by an inverter 54 having its input connected to the non-inverting output of D flip-flop 50.

Figure 8:
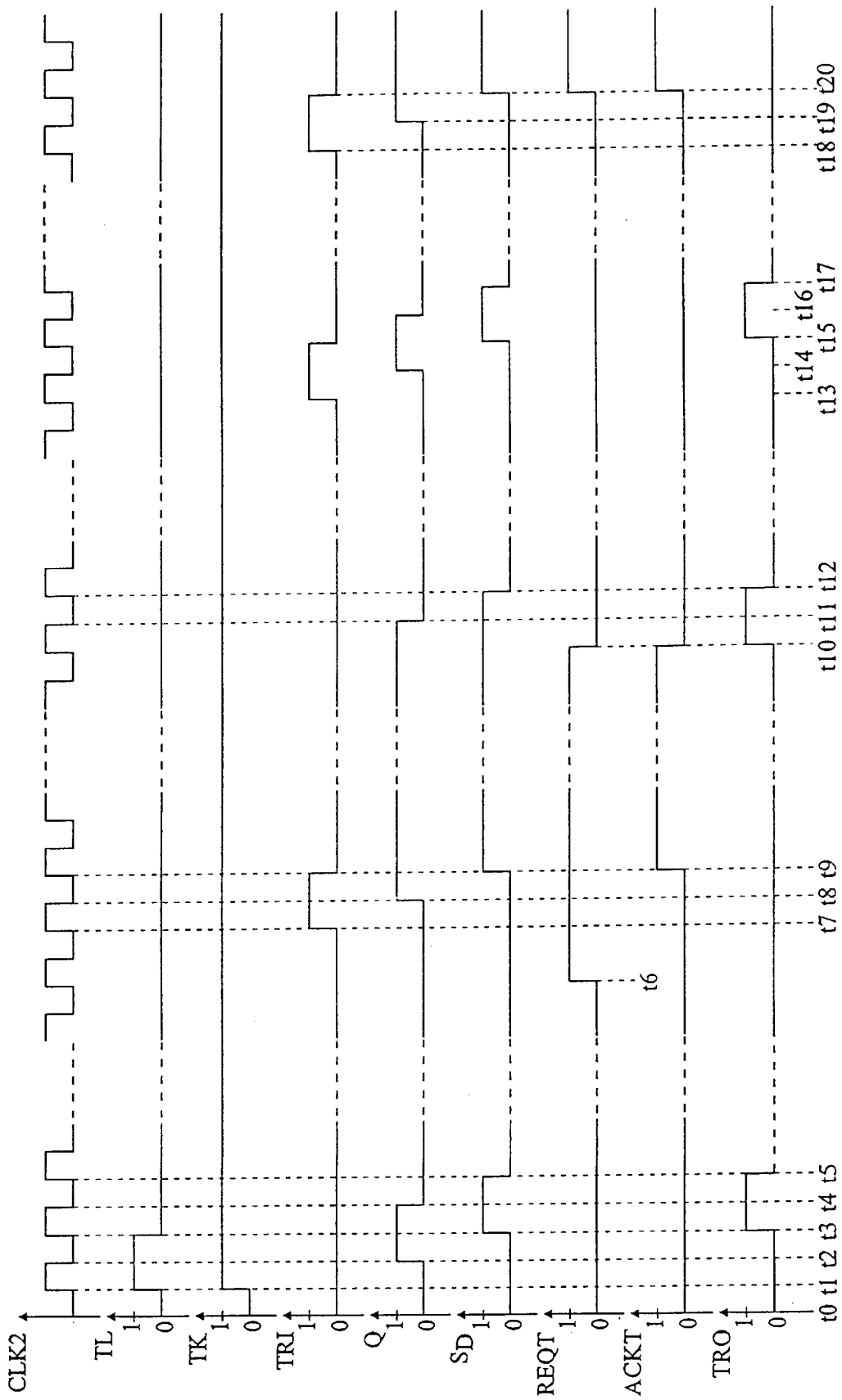
FIG. 8 illustrates, in the form of timing diagrams, the operation of a token ring according to the present invention as shown in FIG. 4.

The operation of token generator 40 will be better understood in relation with the description of FIG. 8.

FIG. 7 shows an implementation example of the token regenerator 41 for regenerating the "token".

Token regenerator 41 includes a JK flip-flop 60 having its non-inverting output Q sent to the input of a D flip-flop 61. D flip-flop 61 is driven by the rising edges of signal CLK2 while JK flip-flop 60 is driven by the falling edges of signal $\overline{CLK2}$ which crosses, for this purpose, an inverter 62. JK flip-flop 60 receives on its J input an OR combination 63 of signals TL and TRI. The K input of JK flip-flop 60 receives signal TRO which issues the regenerated "token". Signal TRO is issued by a two-input AND gate 64. The two inputs are connected, respectively, to the non-inverting output $S_D$ of D flip-flop 61 and to the output of an inverter 65 which receives signal REQT as an input. The output $S_D$ of D flip-flop 61 is further combined with a signal REQT in an AND gate 66. The output of gate 66 is connected to a first input of a multiplexer 67, a second input of which receives signal REQT. Multiplexer 67 is driven by the signal TK issued by block 40. The first input of multiplexer 67 is selected when signal TK is at state "1".

FIG. 8 illustrates the operation of token generator 40 and token regenerator 41. This figure shows, in the form of timing diagrams, signals CLK2, TL, TK, TRI, Q, $S_D$, REQT, ACKT and TRO in an exemplary situation. These signals are considered from the viewpoint of the device 1, 1' or 1" which receives bit DRD.

At power-on of the circuit, it is assumed that signals RESET, TRI, TRO and TL are at state "0". The complement of signal TK thus is at state "1". When microprocessor 3 sets bit DRD to state "1" (time to), the output of gate 51 switches to state "1". Thus, at the following rising edge (time $t_1$) of clock CLK2, signal TL switches to state "1".

The output of inverter 54 thus switches to state "0", which causes the switching to state "1" of signal TK at the output of gate 53. The output of gate 52 then switches to state "0". Meanwhile, the output of gate 63 (block 41) switches to state "1". Thus, at the following falling edge (time $t_2$) of signal CLK2, the Q output of JK flip-flop 60 switches to state "1".

The duration of the pulse issued by signal TL corresponds to one period of clock signal CLK2. That is, at the following rising edge (time $t_3$), signal TL switches back to state "0" due to the switching to state "0" of gate 51 caused by the complement of signal TL and the complement of signal TK. The output of inverter 54 then switches to state "1", which maintains signal TK at state "1".

At time $t_3$, the output $S_D$ of D flip-flop 61 switches to state "1". As signal REQT is at state "0", signal TRO switches to state "1". At the same time, the J input of the JK flip-flop switches to state "0".

The duration of the pulse, or "token", issued by signal TRO is one period of clock CLK2. Indeed, at the following falling edge (time $t_4$) of signal CLK2, the Q output of the JK flip-flop switches to state "0" since its K input is at state "1". Thus, at the following rising edge (time $t_5$) of clock signal CLK2, signal TRO switches back to state "0".

The "token" then circulates on the ring to be, if necessary, taken by other arbitration devices. It is assumed that, in the meantime, signal REQT switches to state "1" (time $t_6$), indicating that at least one entity of group 10 requests an access to bus 2.

When the "token" arrives through signal TRI (time $t_7$), the output of gate 63 switches to state "0". At the following falling edge (time $t_8$) of signal CLK2, the Q output of JK flip-flop 60 thus switches to state "1". Thus, at the following rising edge (time $t_9$) of signal CLK2, output $S_D$ of D flip-flop 61 switches to state "1". This causes the switching to state "1" of the output of gate 66, and since signal TK is at state "1", signal ACKT switches to state "1". Priority decoder 6 can then grant an authorization of access to the bus.

According to the present invention, the signal LOAD issued by priority decoder 6 (FIG. 1) actually is a logic combination taking signal ACKT into account, besides signals CLK1, EOC and MA. This enables only the loading of signals REQ1 to REQ4 (FIG. 1) in register RE when the arbitration device has the ability to authorize an access to bus 2. It avoids a first entity having a high priority rank being overtaken by a second entity of the same group having a low priority rank but having issued an access request before the arrival of the "token" and before the first entity issues its access request. The practical implementation of the logic combination for obtaining signal LOAD is within the abilities of those skilled in the art according to the functional indications given hereinabove.

As an alternative, signal ACKT can be replaced by signal TRI for the enabling of signal LOAD. The use of signal TRI enables the anticipation, by one period of clock signal CLK2, of the authorization to grant an access.

Since signal REQT is at state "1", the switching to state "1" of signal $S_D$, caused by the switching of signal TRI to state "0" at time $t_9$, does not result in sending the "token" through signal TRO.

Signals Q, $S_D$, ACKT remain at state "1" as long as signal REQT does not switch to state "0". Indeed, although the J input of JK flip-flop 60 switches to state "0" at time $t_9$, the flip-flop maintains its output state, that is, Q at state "1", as long as its K input does not switch back to state "1". Unless there is an activation of signal RESET, the switching of output $S_D$ of flip-flop 60 can only be triggered by the sending of the "token", and thus by the switching to "0" of signal REQT. However, signal REQT remains at state "1" until the arrival of a pulse on signal EOC (FIG. 3) even if all signals REQ0 to REQ4 at the input of register RE are at state "0". The "token" is thus held for the whole duration of the memory cycle.

At the arrival of a pulse on signal EOC indicating the approach of an actual end of a memory cycle, signal REQT switches to state "0" (time $t_{10}$). At this time, the output of gate 66 then switches to state "0", causing the switching to state "0" of signal ACKT. The output of gate 64 then switches to state "1". Thus, the "token" is sent before the actual end of the memory cycle.

The switching to state "1" of signal TRO causes, at the following falling edge (time $t_{11}$) of signal CLK2, the switching to state "0" of the Q output of JK flip-flop 60. At the following rising edge (time $t_{12}$) of signal CLK2, output $S_D$ of D flip-flop 61 switches to state "0", which causes the switching to state "0" of signal TRO.

It should be noted that during the sending of the "token", that is, while signal TRO is at state "1", signal REQT is blocked at state "0" even if one of signals REQ0 to REQ4 at the input of register RE is at state "1". This avoids the "token" being partially sent and signal ACKT being switched back to state "1". Further, the "token" is forced to circulate, so as to avoid a group of entities which monopolize access to bus 2.

When a "token" comes back into the device (time $t_{13}$), if signal REQT is at state "0" for all the time when signal TRI is at state "1", the "token" is almost immediately regenerated. The operation of token regenerator 41 between times $t_{13}$, $t_{14}$, $t_{15}$, $t_{16}$ and $t_{17}$ is similar to the operation described for times $t_1$ to $t_5$.

It is thus observed that the generation or the almost immediate regeneration of the "token" actually lasts for one period of clock signal CLK2.

The limit for the arrival of an access request from an entity of a group of entities when the device associated therewith holds the "token" is illustrated by times $t_{18}$ to $t_{20}$. For the device to hold the "token", it is enough for signal REQT to switch to state "1" before the end of the arrival of the "token", that is, before signal TRI switches back to state "0".

It should be noted that if signal REQT is at state "1" at the initial generation of the "token" (time $t_1$ to $t_3$), signal TL has the same effects as the signal TRI at time too or at time $t_{18}$. It should also be noted that the "token" is synchronous with clock signal CLK2.

Signal RESET cancels the "token", whatever arbitration device it is in, and causes the generation of a new "token" at the following period of signal CLK2. Gates 52 and 53 of token generator 40 enable the generation of this new "token", even if signal RESET only carries one pulse and has switched back to state "0" when the rising edge of this next period appears.

Signal TK enables, when a single group of entities, for example group 10, is authorized to have access to the bus, so as to avoid the circulating of the "token" and to operate the arbitration device 1 of this group 10 in a local mode. Group 10 then, once again, uses contiguous memory cycles in case of a surge of access requests from the entities associated therewith. For this purpose, bit DRD is set at state "0" to prevent the generation of a "token" and the signal RESET of device 1 is set at state "1" while the signals RESET of the other devices 1' and 1" are maintained at state "0". Devices 1' and 1" have their signal TK at state "1" and expect a "token" which will not come, while device 1 operates as if it permanently held the "token", due to its signal TK being at state "0". Indeed, as soon as the signal REQT of device 1 switches to state "1", its signal ACKT switches to state "1" due to the selection of the second input of multiplexer 67. Such an operating mode can be useful, for example, when a single one of the groups of entities is operating. The "token" is then automatically established, under control of microprocessor 3, as soon as another group 11 or 12 is started.

It should be noted that, even if the bit DRD of device 1 is at state "1", the "token" will not be sent by the device since signal RESET is kept at state "1", which forces signal $S_D$ to state "0". However, the signal TL of device 1 reproduces, in this case, signal CLK2, which causes power consumption.

Of course, the present invention is likely to have various alternatives, modifications, and improvements which will readily occur to those skilled in the art. In practice, each of the elements described can be replaced by one or several elements performing the same function.

Such alterations, modifications, and improvements are intended to be part of this disclosure, and are intended to be within the spirit and the scope of the invention. Accordingly, the foregoing description is by way of example only and is not intended to be limiting. The invention is limited only as defined in the following claims and the equivalents thereto.

What is claimed is:

1. A device for organizing access to a bus connecting a memory to at least two entities issuing respective asynchronous binary access request signals representing respective requests for access to the bus, the device issuing binary authorization signals for authorizing access to the bus to the at least two entities based on a determination of priority between different requests, wherein the device includes a priority decoder in wired logic associated with an input register, a loading of states of the access request signals into the input register occurring, when an access request is present while a read or write cycle of the memory is being executed, upon an arrival of a pulse on a signal EOC issued by a memory controller associated with the memory, the pulse on the signal EOC indicative of an end of a memory cycle, and the memory controller constituting an electric interface between the bus and the memory.

2. A device according to claim 1, wherein the signal EOC indicative of the end of the memory cycle is sent by the memory controller at a time in advance with respect to an actual end of the memory cycle, the actual end of the memory cycle following the signal EOC by a delay which is a function of an access request processing time of the priority decoder.

3. A device according to claim 1, further including a programmable register (RP) containing codes for identifying the at least two entities, a location of each code in the programmable register determining a priority rank assigned to the respective entity associated with the code and the programmable register being read by the priority decoder as a loading of a state of the access request signals in the input register is triggered.

4. A device according to claim 3, wherein the loading of the state of the access request signals in the input register is controlled by a signal LOAD representing a logic combination taking into account at least the signal EOC indicative of the end of the memory cycle and a first clock signal.

5. A device according to claim 4, wherein the priority decoder sends to the memory controller a binary signal MA indicative of a presence of the authorized access request, a state of said binary signal MA being set to an active state "1" by the presence of the authorized access request and set to an idle state "0" by an arrival of a pulse on the signal EOC indicative of the end of the memory cycle.

6. A device according to claim 5, wherein the signal LOAD for controlling the input register is enabled by a complement of the binary signal MA indicative of the presence of the authorized access request.

7. A device according to claim 1, wherein one entity of the plurality of entities sends periodic access requests and has a specific priority management scheme which includes assigning a lowest priority rank to the one entity for one half-period of a time interval which separates two of its access requests and assigning a highest priority rank for a second half-period of the time interval when its access request has not been answered in the first half-period.

8. A device according to claim 7, wherein the memory is a dynamic memory, the entity with the specific priority management scheme including a circuit for refreshing the dynamic memory.

9. A device according to claim 1, wherein one entity of the plurality of entities includes a microprocessor.

10. A device according to claim 1, including connecting means for connecting to at least one other device of a same type to organize a sharing of the memory between at least two groups of entities, an assignment of the bus to one of the groups of entities being performed by circulating a token in a single wire line connecting the at least two devices in a ring, each device receiving the token as an input signal TRI sent by the other device as an output signal TRO.

11. A device according to claim 10, wherein said connecting means include a token regenerator to regenerate the token, the token regenerator including flip-flops controlled by a second clock signal and logic gates, the token regenerator to receive the input signal TRI, a first binary signal REQT indicative of an existence of an access request within the respective group associated therewith and to issue, to the priority decoder of the respective device associated therewith, a second binary signal ACKT indicative of an assignment of the token to the respective device, a width of a pulse which constitutes the token corresponding to one period of the second clock signal.

12. A device according to claim 11, wherein the sending of the token by the token regenerator as the output signal TRO is triggered by at least one of the arrival of the signal EOC indicative of the end of the memory cycle and an absence of access requests from the entities of the respective group associated therewith while the token is present on the input signal TRI, the sending of the token being synchronous with the second clock signal.

13. A device according to claim 4, wherein the device includes connecting means for connecting to at least one other device of a same type to organize a sharing of the memory between at least two groups of entities, an assignment of the bus to one of the groups of entities being performed by circulating a token in a single wire line connecting the at least two devices in a ring, each device receiving the token as an input signal TRI sent by the other device as an output signal TRO and wherein the control signal of the input register of a respective device is enabled by the signal indicative of an assignment of the token to the respective device.

14. A device according to claim 10, wherein said connecting means include a token generator to initially generate the token under control of a bit DRD, the token generator to issue a signal TK to switch the token regenerator between ring operation and local mode operation wherein the respective device holds a right to authorize an access to the bus.

15. A system, comprising:

a bus;

a plurality of access devices connected to the bus, each of the devices to access the bus;

a memory connected to the bus, the memory including a memory controller to output a signal EOC to indicate an end of a memory cycle of the memory; and an arbitration device connected to each access device of the plurality of access devices and the memory controller, the arbitration device to receive the signal EOC and at least one request to access the bus from at least one access device and when a plurality of access requests are pending the arbitration device to grant access to a requesting access device having a highest access priority level amongst the requesting access devices, wherein the arbitration device processes a next bus request upon receipt of the signal EOC from the memory controller.

16. The system as recited in claim 15, wherein the arbitration device comprises:

an input register to receive the at least one access request from the at least one access device;

a priority register to store a plurality of unique access priority levels associated, respectively, with each access device of the plurality of access devices; and a priority decoder circuit connected to the priority register and the input register, the priority decoder circuit to receive the at least one access request from the input register and, when a plurality of access requests are pending, determine an access priority level for each at least one access request as a function of the access priority levels stored in the priority register.

17. The system as recited in claim 15, wherein the arbitration device outputs a binary signal MA in an active state when access has been granted to a device, and wherein the memory controller is coupled to the arbitration device to receive the binary signal MA.

* * * * *